US012505292B2

(12) United States Patent
Gupta et al.

(10) Patent No.: US 12,505,292 B2
(45) Date of Patent: Dec. 23, 2025

(54) APPARATUSES, METHODS, AND COMPUTER PROGRAM PRODUCTS FOR GENERATING AN ABSTRACTIVE CONTEXT SUMMARY SCHEDULING INTERFACE CONFIGURED FOR SCHEDULING AND OUTPUTTING ABSTRACTIVE CONTEXT SUMMARIES FOR MULTI-PARTY COMMUNICATION CHANNELS

(71) Applicants: ATLASSIAN PTY LTD., Sydney (AU); ATLASSIAN US, INC., San Francisco, CA (US)

(72) Inventors: Vasu Gupta, Delhi (IN); Utkarsh Tyagi, New Delhi (IN); Ayushi Gupta, New Delhi (IN); Aneesh Kundu, Delhi (IN)

(73) Assignees: ATLASSIAN PTY, LTD., Sydney (AU); ATLASSIAN US, INC., San Francisco, CA (US)

( * ) Notice: Subject to any disclaimer, the term of this patent is extended or adjusted under 35 U.S.C. 154(b) by 345 days.

(21) Appl. No.: 17/936,695

(22) Filed: Sep. 29, 2022

(65) Prior Publication Data
US 2024/0111798 A1    Apr. 4, 2024

(51) Int. Cl.
*G06F 40/00*     (2020.01)
*G06F 16/34*     (2019.01)
(Continued)

(52) U.S. Cl.
CPC .......... *G06F 40/284* (2020.01); *G06F 16/345* (2019.01); *G06N 20/00* (2019.01)

(58) Field of Classification Search
CPC ...... G06F 16/345; G06F 40/284; G06F 16/34; G06F 16/335; G06F 16/337;
(Continued)

(56) References Cited

U.S. PATENT DOCUMENTS

| 7,034,691 B1 | 4/2006 | Rapaport et al. |
| 10,276,031 B1 | 4/2019 | Ho et al. |

(Continued)

OTHER PUBLICATIONS

Defensive Publication Series, "Automatic Creation of Communication Channels Around Detected Events", Technical Disclosure Commons, Dec. 15, 2017 (Year: 2017).*

(Continued)

*Primary Examiner* — Edgar X Guerra-Erazo
(74) *Attorney, Agent, or Firm* — Alston & Bird LLP

(57) ABSTRACT

Methods, apparatuses, or computer program products provide for enabling generation of abstractive context summaries for multi-party communication channels. An abstractive context summary scheduling interface associated with a selected multi-party communication channel may be caused to be rendered to a client computing device associated with a member profile identifier. A summary generation parameter set may be received in response to user engagement with the abstractive context summary scheduling interface. A plurality of communication data objects from the selected multi-party communication channel may be extracted based on the summary generation parameter set. An abstractive context summary for the selected multi-party communication channel may be generated based on the plurality of communication data objects and utilizing a text summarization machine learning model. The abstractive context (Continued)

summary may be caused to be rendered for display on the client computing device associated with the member profile identifier.

20 Claims, 11 Drawing Sheets

(51) Int. Cl.
    *G06F 40/284*      (2020.01)
    *G06N 20/00*      (2019.01)

(58) Field of Classification Search
    CPC ...... G06F 16/338; G06F 16/367; G06F 16/36; G06F 16/44; G06F 18/20; G06F 18/21; G06F 18/213; G06F 40/00; G06F 40/10; G06F 40/106; G06F 40/103; G06F 40/131; G06F 40/20; G06F 40/237; G06F 40/242; G06F 40/253; G06F 40/258; G06F 40/263; G06F 40/268; G06F 40/279; G06F 40/289; G06F 40/295; G06F 40/35; G06F 40/30; G06F 40/58; G06N 20/00; G06N 3/08; G06N 3/0455; H04L 51/216; H04L 12/1813; H04L 12/1818; H04L 12/1822; H04L 12/1827; H04L 12/1831; H04L 12/1895; H04L 12/22

See application file for complete search history.

(56) References Cited

U.S. PATENT DOCUMENTS

| | | | |
|---|---|---|---|
| 10,931,759 | B2 | 2/2021 | Duran et al. |
| 11,710,000 | B1* | 7/2023 | Cuan ................... G06F 16/345 709/206 |
| 2014/0067377 | A1 | 3/2014 | Reiter |
| 2017/0364588 | A1 | 12/2017 | Bastide et al. |
| 2023/0069113 | A1 | 3/2023 | Tsuchida et al. |
| 2023/0259544 | A1 | 8/2023 | Sotudeh et al. |
| 2023/0376515 | A1* | 11/2023 | Tanikella ............. G06Q 10/101 |
| 2023/0385556 | A1 | 11/2023 | Ranganathan et al. |
| 2024/0086461 | A1 | 3/2024 | Varakin |
| 2024/0111959 | A1 | 4/2024 | Gupta et al. |
| 2024/0249068 | A1 | 7/2024 | Aldred et al. |

OTHER PUBLICATIONS

Final Rejection Mailed on Nov. 6, 2025 for U.S. Appl. No. 17/936,705, 21 page(s).

Non-Final Rejection Mailed on Nov. 6, 2025 for U.S. Appl. No. 18/477,176, 19 page(s).

\* cited by examiner

FIG. 9

APPARATUSES, METHODS, AND COMPUTER PROGRAM PRODUCTS FOR GENERATING AN ABSTRACTIVE CONTEXT SUMMARY SCHEDULING INTERFACE CONFIGURED FOR SCHEDULING AND OUTPUTTING ABSTRACTIVE CONTEXT SUMMARIES FOR MULTI-PARTY COMMUNICATION CHANNELS

BACKGROUND

Group chats and other collaborative knowledge base environments tend to produce large volumes of information that can be overwhelming and difficult to navigate for new users. Applicant has identified many deficiencies and problems associated with systems that support such group chats and collaborative knowledge base environments. Through applied effort, ingenuity, and innovation, these identified deficiencies and problems have been solved by developing solutions that are in accordance with the embodiments of the present invention, many examples of which are described in detail herein.

BRIEF SUMMARY

Embodiments of the present disclosure relate to apparatuses, methods, and computer program products for enabling generation of abstractive context summaries for multi-party communication channels.

In accordance with one aspect, an apparatus comprising at least one processor and at least one memory including computer program code is provided. In one embodiment, the at least one memory and the computer program code may be configured to, with the processor, cause the apparatus to: cause rendering of an abstractive context summary scheduling interface associated with a selected multi-party communication channel to a client computing device associated with a member profile identifier, receive a summary generation parameter set in response to user engagement with the abstractive context summary scheduling interface, extract a plurality of communication data objects from the selected multi-party communication channel based on the summary generation parameter set, generate, based on the plurality of communication data objects and utilizing a text summarization machine learning model, an abstractive context summary for the selected multi-party communication channel, cause rendering of the abstractive context summary for display on the client computing device associated with the member profile identifier.

In accordance with another aspect, a method is provided. In one embodiment, the method comprises: causing rendering of an abstractive context summary scheduling interface associated with a selected multi-party communication channel to a client computing device associated with a member profile identifier, receiving a summary generation parameter set in response to user engagement with the abstractive context summary scheduling interface, extracting a plurality of communication data objects from the selected multi-party communication channel based on the summary generation parameter set, generating, based on the plurality of communication data objects and utilizing a text summarization machine learning model, an abstractive context summary for the selected multi-party communication channel, and cause rendering of the abstractive context summary for display on the client computing device associated with the member profile identifier.

In accordance with another aspect, a computer program product is provided. The computer program product may comprise at least one computer-readable storage medium having computer-readable program code portions stored therein, the computer-readable program code portions comprising executable portions configured to: cause rendering of an abstractive context summary scheduling interface associated with a selected multi-party communication channel to a client computing device associated with a member profile identifier, receive a summary generation parameter set in response to user engagement with the abstractive context summary scheduling interface, extract a plurality of communication data objects from the selected multi-party communication channel based on the summary generation parameter set, generate, based on the plurality of communication data objects and utilizing a text summarization machine learning model, an abstractive context summary for the selected multi-party communication channel, and cause rendering of the abstractive context summary for display on the client computing device associated with the member profile identifier.

BRIEF DESCRIPTION OF THE SEVERAL VIEW OF THE DRAWINGS

Having thus described some embodiments in general terms, references will now be made to the accompanying drawings, which are not drawn to scale, and wherein:

FIG. 9 is an operational example of an abstractive context summary scheduling interface in accordance with at least some embodiments of the present invention.

DETAILED DESCRIPTION OF VARIOUS EMBODIMENTS

Figure 1:
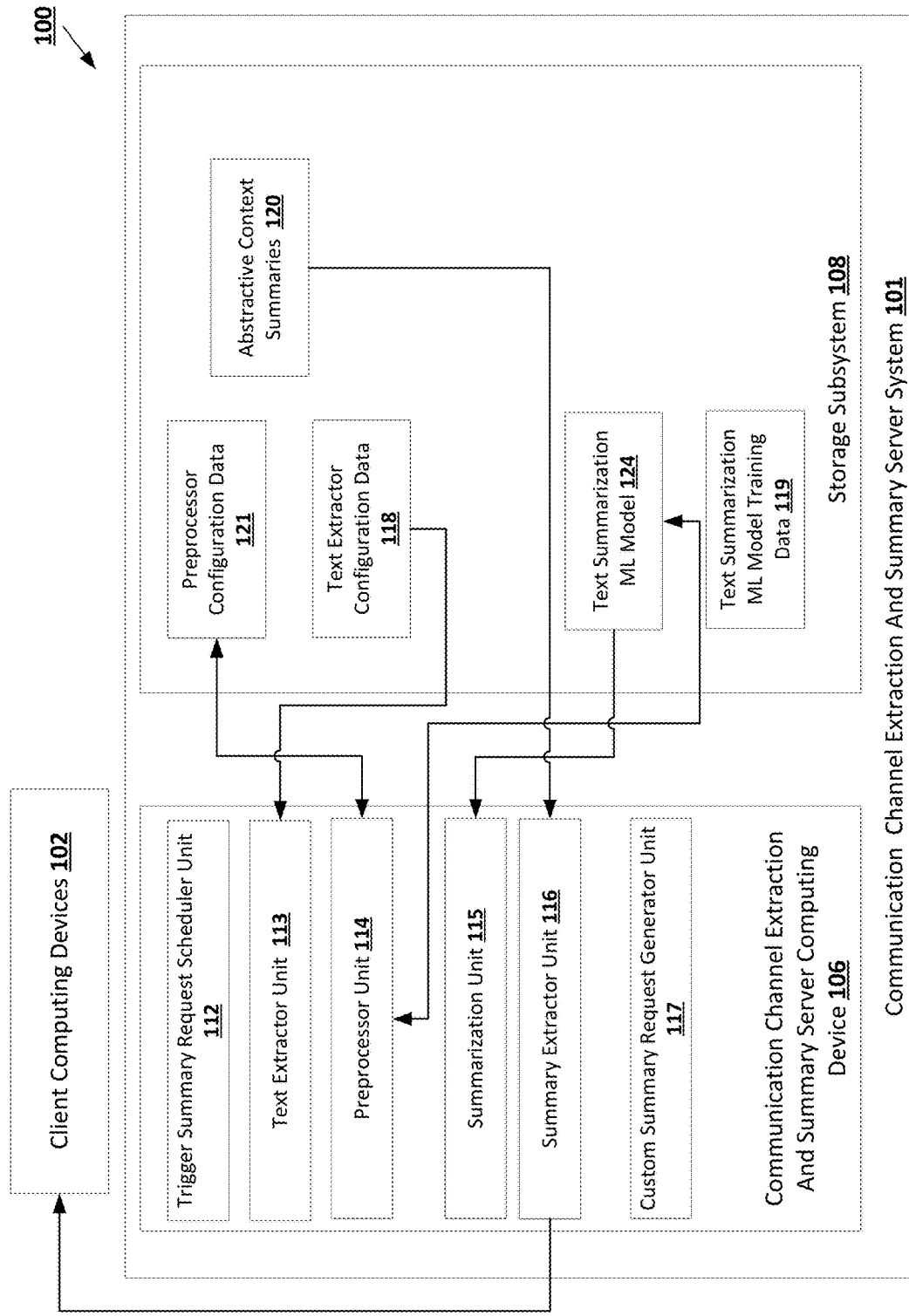
FIG. 1 is a block diagram of an example communication channel extraction and summary server system architecture within which at least some embodiments of the present invention may operate.

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention address technical problems associated with multi-party communication channel platforms that quickly produce large volumes of information that can be overwhelming and difficult to navigate for new and even existing users. Consider an incident manager, Jake, who works for Acme Corporation and is tasked with assessing, triaging, and mitigating alerts and incidents as they occur in Acme's software as a service (SaaS) enterprise accounting platform (the "Acme platform") that is used by millions of customers worldwide. When Jake is at lunch one day, he receives a notification from Acme's alert monitoring software (e.g., Jira Service Management or OpsGenie hosted by Atlassian) that an alert has been detected associated with a credential management service of the Acme platform. The type of alert suggests that urgent action is needed to address an error that could potentially take the credential management service offline thereby locking out thousands of Acme users.

Jake is immediately added to numerous multi-party communication channels (e.g., group chats, discussion threads, etc.) involving teams of Acme employees that are working to address the problem. He is also added to a multi-party communication channel that captures communications surrounding the initial development and release of the credential management service and another multi-party communication channel associated with recent updates to of the credential management service. By the time Jake frantically returns from lunch, pages of discussion threads have been created in the various multi-party communication channels concerning the alert, the underlying error, possible causes, possible solutions, and numerous other topics. The multi-party communication channels focused on the initial development and updates to the credential management service include months of discussion threads involving a multitude of topics.

Various embodiments of the present invention are directed to a communication channel extraction and summary server system that is configured to efficiently and reliably generate abstractive summaries for multi-party communication channels like those recently joined by Jake. The below disclosed system is configured to extract communication data objects (e.g., discussion thread text and other context) from each of the multi-party communication channels, analyze such communication data objects using natural language processing and text summarization machine learning models, and generate abstractive summaries for each multi-party communication channel so that such abstractive summaries can be presented to Jake to provide context for Jake upon joining each respective multi-party communication channel.

Communication channel extraction and summary server systems configured as disclosed herein produce a number of technical benefits. For example, the disclosed systems operate periodically in parallel to multi-party communication channel discussions and are thereby configured to render a low-latency abstractive context summary for Jake immediately at the time that he first accesses each of the above referenced multi-party communication channels. The disclosed system is further configured to reduce the computational expense needed to get Jake and others up to speed on both of the client and back-end server sides of the network. On the client side, the client computing device need only fetch and render abstractive context summary page content and not content associated with numerous pages of discussion threads. On the back-end server side, the back-end server can deliver isolated content associated with abstractive summaries for each multi-party communication channel accessed by Jake or other new users rather than supporting page loads for endless scrolling by Jake or other users as they attempt to get quickly up to speed.

The above examples describe circumstances in which a new user (i.e., Jake) is first accessing a series of multi-party communication channels. However, various embodiments of the present invention may be applied to other member events (i.e., multi-party communication channel member events) such as a system determination that a user has been away from an active multi-party communication channel for a defined period of time. Communication channel extraction and summary server systems configured as disclosed herein may be configured to produce and render low latency abstractive summaries to such returning users as well.

Member events that trigger abstractive context summary rendering may also be tied to specific alerts or incidents. As the complexity of an incident rises or as more triage and repair workstreams come online, more multi-party communication channels may be created, making it more difficult for a new user to quickly gather important context and status information. Various embodiments of the present invention are directed to alleviating these issues by providing a communication channel extraction and summary server system that is configured to programmatically generate an abstractive context summary of the content of each multi-party communication channel that is associated with an alert or incident identifier.

Communication channel extraction and summary server systems configured as disclosed herein are further configured to cause rendering of a abstractive context summary scheduling interface associated with a selected multi-party communication channel or a group of selected multi-party communication channels (e.g., perhaps a group of multi-party communication channels sharing a common incident identifier) that is configured to allow an accessing user (e.g., Jake) to define a summary generation parameter set (e.g., topics, keywords, date ranges) that is used to build and/or refine one or more abstractive context summaries. Such summary generation parameter sets may, for example, be used to define the scope of communication data objects that are extracted from the multi-party communication channels or otherwise used as inputs for the natural language processing and machine learning models.

Definitions

As used herein, the terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client computing device," "computing device," "network device," "computer," "user equipment," and similar terms may be used interchangeably to refer to a computer comprising at least one processor and at least one memory. In some embodiments, the client computing device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client computing device" may refer to computer hardware and/or software that is configured to access a service made available by a server. The server is often, but not always, on another computer system, in which case the client accesses the service by way of a network. Embodiments of client computing devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The term "multi-party communication identifier" refers to one or more items or elements by which a multi-party communication channel may be uniquely identified from other multi-party communication channels. The multi-party communication identifier may be in the form of text string(s), numerical character(s), alphabetical character(s), alphanumeric code(s), American Standard Code for information Interchange (ASCII) characters(s), and/or the like.

The term "member profile identifier" refers to one or more items or elements by which a member (e.g., user) associated with a multi-party communication data object may be uniquely identified from other members associated with the multi-party communication channel. In some embodiments, the member profile identifier may be in the form of text string(s), numerical character(s), alphabetical character(s), alphanumeric code(s), American Standard Code for information Interchange (ASCII) characters(s), and/or the like.

The term "incident identifier" refers to one or more items or elements by which an incident alert may be uniquely identified from other incident alerts. The incident identifier may be in the form of text string(s), numerical character(s), alphabetical character(s), alphanumeric code(s), American Standard Code for information Interchange (ASCII) characters(s), and/or the like.

The term "multi-party communication channel" refers to an electronic communication medium configured for providing collaborative capabilities that enable a plurality of client computing devices to transmit, display, receive, access, and/or engage with communication data objects generated by the plurality of client computing devices, wherein each client computing device of the plurality of client computing devices may be associated with a member profile identifier. Accordingly, a multi-party communication channel may be associated with a plurality of members. In various embodiments, the multi-party communication channel comprises or is otherwise associated with a shared multi-party communication channel interface configured for rendering to each client computing device of the plurality of client computing devices (e.g., member client computing devices), such that each member may engage/interact with the multi-party communication channel interface to generate and transmit communication data objects, as well as view communication data objects transmitted by the various members associated with the corresponding multi-party communication channel. For example, each communication data object may be rendered for display on the shared multi-party communication interface, such that each communication data object is visible to all members via the shared multi-party communication interface. A multi-party communication channel may comprise an order that describes an order of the communication data objects associated with the multi-party communication channel. In various embodiments, the noted order of communication data objects may be based on the order in which the communication data objects are generated and/or transmitted by a member client computing device. Examples of a multi-party communication channel include an electronic chat room, discussion thread, and/or the like configured to display a stream of messages generated by associated users/member.

A multi-party communication channel may be associated with a server computing device, an application program, platform, and/or service configured to support a plurality of multi-party communication channels and/or enable generation of a plurality of multi-party communication channels. A multi-party communication channel may be associated with one or more server computing devices, wherein the one or more server computing devices may be configured to host and/or support the multi-party communication channel. As a non-limiting example, in some embodiments, the multi-party communication channel may be associated with an incident management platform and/or system (e.g., a monitoring software and/or associated hardware that provides functionalities to manage incidents and generate alerts for these incidents). An incident may describe an issue/problem that requires resolution (e.g., a performance issue with a software provided by a software provider). For instance, continuing with the Jake incident manager example, in response to an incident alert initiated by a monitoring software (e.g., Jira Service Management or OpsGenie hosted by Atlassian), one or more multi-party communication channels may be generated to address/resolve the incident issue. For example, multiple multi-party communication channels may be generated to address the issue, where each multi-party communication channel may focus on a different task and/or aspect with respect to the issue, and/or may be associated with a topic, a workstream, a corrective action, and/or the like with respect to the issue. Moreover, various members may join or otherwise be associated with the multi-party communication channels. As an example, each multi-party communication channel may be associated with a plurality of members and a member may be associated with one or more multi-party communication channels. A multi-party communication channel may be associated with metadata, such as the multi-party communication channel identifier, a topic identifier, a subject matter identifier, an incident identifier, a workstream identifier, a priority indicator and/or the like.

The term "communication data object" refers to a data entity that describes at least a portion of the content data (e.g., text or other media) associated with a multi-party communication channel. In various embodiments, a communication data object comprise a message transmitted, posted, and/or visible on the shared multi-party communication interface of a multi-party communication channel. A communication data object may be generated through a member's engagement/interaction with the multi-party communication channel (e.g., via associated multi-party communication channel interface). For example, a member may type out pieces of data into the multi-party communication channel interface to generate communication data objects (e.g., messages). The text, contents, data, and other media within each communication data object may be capable of being transmitted, received, and/or stored in accordance with embodiments of the present invention. The text, content, data, and other media may be sent and received between multiple computers, multiple servers, and may pass through multiple relays, routers, network access points, base stations, hosts, and/or the like, which is sometimes referred to as a "network." Each communication data object may be associated with metadata, such as a timestamp configured to describe when a respective communication data object was generated and/or posted to the multi-party communication channel, a member profile identifier that describes the member that generated the communication data object, and/or the like. Communication data objects associated with a multi-party communication channel may be extracted by a communication channel extraction and summary server computing device and processed by the communication channel extraction and summary server computing device to generate an abstractive context summary for the multi-party communication channel.

The term "abstractive context summary" refers to a data object that is configured to describe a summary of a multi-party communication channel that is generated based on an inferred paraphrasing of a plurality of communication data objects of the multi-party communication channel. In various embodiments, an abstractive context summary for a multi-party communication channel is configured to provide context to a member (e.g., new member or exiting member) with respect to the content of the multi-party communication channel. An abstractive context summary may be generated by a communication channel extraction and summary server computing device in response to a summary trigger request. In some embodiments, abstractive context summaries are generated utilizing a text summarization machine learning model. The text, contents, data, and other media within each abstractive context summary may be capable of being transmitted, received, and/or stored in accordance with embodiments of the present invention. For example, various embodiments of the present invention describe storing an abstractive context summary of a multi-party communication channel for retrieval when a new member joins the multi-party communication channel. Abstractive context summaries may be stored in a summary storage location, such as a storage subsystem of the communication channel extraction and summary server computing device, and may be retrieved from the summary storage location and transmitted to a member client computing device. In various embodiments, an abstractive context summary is transmitted for display on a client associated with a particular member profile identifier, such that the transmitted abstractive context summary is visible on the multi-party communication channel (e.g., associated multi-party communication interface) only on the client computing device associated with the particular member profile identifier. For example, an abstractive context summary may be transmitted to a client computing device as an ephemeral abstractive context summary, such that it is visible on only the intended member's (e.g., recipient's) client computing device. In some embodiments, the abstractive context summary is a customized abstractive context summary that is generated based on one or more summary generation parameters. In some embodiments, the one or more summary generation parameters may be received via an abstractive context summary scheduling interface rendered to a client computing device associated with a member profile identifier.

The term "summary trigger request" refers to a signal, data, and/or computer readable instructions received by one or more computing devices (e.g., a communication channel extraction and summary server computing device) that comprises, represents, indicates, and/or is associated with a request to generate an abstractive context summary for a multi-party communication channel. Each summary trigger request is associated with a multi-party communication channel identifier, wherein an abstractive context summary may be generated for a corresponding multi-party communication channel based on the multi-party communication channel identifier. In some embodiments, the summary trigger request is generated periodically or in accordance with other summary trigger transmission scheme.

The term "text summarization machine learning model" refers to a data object that is configured to describe parameters, hyper parameters, and/or defined operations of a machine learning model that is configured to process text inputs (e.g., communication data objects associated with a multi-party communication channel) in order to generate an abstractive context summary of the text input. For example, in various embodiments, the text summarization machine learning model is configured to process at least a subset of the communication data objects associated with a multi-party communication channel in order to generate an abstractive context summary for the multi-party communication channel based on the noted subset of communication data objects. In various embodiments, the configuration data for a corresponding text summarization machine learning model may be stored on a storage subsystem associated with a communication channel extraction and summary server computing device. Examples of text summarization machine learning models include a T5 text summarization machine learning model and one or more variants of a Pegasus text summarization machine learning model. In some embodiments, the text summarization machine learning model may be an attention-based transformer text summarization machine learning model.

The term "attention-based transformer text summarization machine learning model" refers to a text summarization machine learning model that utilizes an attention based mechanism to infer the context of a particular token in the text input of the text summarization machine learning in relation to other tokens of the text summarization machine learning model. The attention-based mechanism of an attention-based transformer text summarization machine learning model may be a trained attention-based mechanism. The attention-based mechanism of the attention-based transformer text summarization machine learning model may be stored as part of the configuration data for a corresponding text summarization machine learning model on a storage subsystem associated with a communication channel extraction and summary server computing device. Examples of attention-based transformer text summarization machine learning model include the T5 text summarization machine learning model and the Pegasus text summarization machine learning model. In some embodiments, the T5 text summarization machine learning model includes an encoder and decoder which can collectively be trained on a multi-task mixture of unsupervised and supervised problems like summarization, text classification, and question and answering. The T5 text summarization model generates an abstractive context summary (or paraphrased summary) instead of an extractive summary in order to create a more natural-sounding summary that may mimic the human language.

The term "member event indication" refers to a data object that is generated and/or created by a computing device based on one or more events associated with a member profile identifier. In various embodiments, a member event indication may trigger the generation of an abstractive context summary. Examples of a member event indication include member join event generated when a new member joins a multi-party communication channel, member rejoin event generated when an existing member rejoins a multi-party communication channel after a period of time that exceeds a defined threshold, a delayed access event, and/or the like. A member event indication may be generated based on user engagement/interaction(s) with the multi-party communication channel and/or associated metadata. In some embodiments, the communication channel extraction and summary server computing device may be configured, in response to determining and/or receiving a member event indication, to retrieve an abstractive context summary for a particular multi-party channel communication channel for display on a client computing device associated with the member profile identifier associated with the member event indication. In some embodiments, the communication channel extraction and summary server computing device may be configured to monitor the multi-party communication channel to determine a member event indication.

The term "summary storage location" refers to a location, such as a database/repository stored on a memory device, which is accessible by one or more computing devices for retrieval and storage of abstractive context summaries for multi-party communication channels. In some embodiments, the summary storage location may be a dedicated device and/or a part of a larger repository. In some embodiments, the summary storage location may comprise abstractive context summary of selected multi-party communications. For example, in some embodiments, the summary storage location may comprise abstractive context summary for multi-party communication channels that are associated with a priority indicator.

The term "priority indicator" refers to a data object that is associated with one or more multi-party communication channels and configured to indicate a weight (e.g., importance level, significance level, and/or the like) of the one or more multi-party communication channels relative to other multi-party communication channels. Continuing with the Jake Incident Manager example, as an example, a priority indicator may be assigned to and/or associated with multi-party communication channels associated with an incident (e.g., multi-party communication data objects that are generated in response to an incident alert). As another example, a priority indicator may be assigned to and/or associated with multi-party communication channels associated with an incident whose severity level (e.g., criticalness of the associated issue/incident) exceeds a defined threshold. In some embodiments, an abstractive context summary may be generated for a multi-party communication channel based on whether the multi-party communication channel is associated with a priority indicator. In some embodiments, an abstractive context summary may be transmitted to a client computing device based on whether the multi-party communication channel is associated with a priority indicator. For example, in some embodiments, only abstractive summaries for multi-party communication channels associated with a priority indicator may be transmitted to a client computing device.

The term "abstractive context summary scheduling interface" refers to a user interface that is generated by the communication channel extraction and summary server computing device and may be rendered to a client computing device in response to a customized summary request. The abstractive context summary scheduling interface may be a user interface component or sub-user interface component that is specially configured to enable a member associated with a multi-party communication channel to provide one or more summary generation parameters (e.g., one or more keywords, topic, date range, and or the like) that are used to generate a customized abstractive context summary. The abstractive context summary scheduling interface may comprise one or more abstractive context summary scheduling interface elements and/or data fields configured for receiving the one or more summary generation parameters.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, the like or any combination of the aforementioned devices.

FIG. 1 depicts an example communication channel extraction and summary server system architecture 100 for generating an abstractive context summary. The architecture 100 includes one or more client computing devices 102 and a communication channel extraction and summary server system 101. The communication channel extraction and summary server system 101 is configured to generate abstractive context summaries for selected multi-party communication channels, store the abstractive context summaries in a summary storage location, and selectively provide the abstractive context summaries to client computing devices 102 in response to member event indications. Additionally and/or alternatively, the communication channel extraction and summary server system 101 is configured receive customized summary requests from client computing devices 102, cause rendering of an abstractive context summary scheduling interface to client computing devices 102, and provide customized abstractive context summaries (e.g., member-specific abstractive context summaries) in response to the noted customized summary requests.

The communication channel extraction and summary server system 101 may include a communication channel extraction and summary server computing device 106 and a storage subsystem 108. The communication channel extraction and summary server computing device 106 may be configured to receive member event indications and customized summary requests from client computing devices 102, as well as provide abstractive context summaries to the client computing devices 102 in response to the noted member event indications and/or the noted customized summary requests. The communication channel extraction and summary server computing device 106 may be configured to utilize a text summarization machine learning (ML) model 124 to generate abstractive context summaries.

The communication channel extraction and summary server system 101 comprises a trigger summary request scheduler unit 112, a text extractor unit 113, a preprocessor unit 114, a summarization unit 115, a summary extractor unit 116, and a customized summary request generator unit 117. The trigger summary request scheduler 112 is configured to transmit summary trigger requests for multi-party communication channels to the text extractor unit 113 in order to initiate generation of abstractive context summaries for the noted multi-party communication channels, receive generated abstractive context summaries, and store abstractive context summaries in one or more summary storage locations (e.g., storage subsystem 108). The text extractor unit 113 is configured to extract content data (e.g., communication data objects and associated metadata) of multi-party communication channels in response to summary trigger requests and/or a customized summary requests. The preprocessor unit 114 is configured to preprocess extracted content data to generate machine learning-ready input data for a text summarization machine learning model 124. The summarization unit 115 is configured to process the extracted content data (e.g., preprocessed content data) using the text summarization machine learning model 124 to generate abstractive context summaries for the multi-party communication channels. The summary extractor unit 116 is configured to receive member event indications (e.g., member event notifications), retrieve from the one or more summary storage locations the latest abstractive context summary for a multi-party communication channel corresponding to a member event indication, and render the retrieved abstractive context summary for display on a corresponding client computing device 102.

The storage subsystem 108 may be configured to store data associated with the communication channel extraction and summary server computing device 106, such as preprocessor configuration data 121, text extractor configuration data 118, and text summarization machine learning model training data 119. The storage subsystem 108 may also be configured to persistently store abstractive context summaries 120, and may be configured to store the text summarization machine learning model 124.

The text summarization machine learning model 124 includes parameters, hyper-parameters, and/or defined operations of a machine learning model that is configured to process a text input (e.g., content data of a multi-party communication channel) in order to generate an abstractive context summary (as opposed to an extractive summary) of the text input. The configuration data for a corresponding text summarization machine learning model may be stored on a storage subsystem, such as storage subsystem 108. Examples of text summarization machine learning models include a T5 text summarization machine learning model and one or more variants of a Pegasus text summarization machine learning model.

The client computing devices 102 and the communication channel extraction and summary server computing device 106 may communicate over one or more networks. The client computing device 102 may also communicate with one or more external server computing devices (e.g., host server for multi-party communication channels). A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Web Socket channel. In some embodiments, the protocol is JSON over RPC, JSON over REST/HTTP, and the like.

Example Communication Channel Extraction and Summary Server Computing Device

Figure 2:
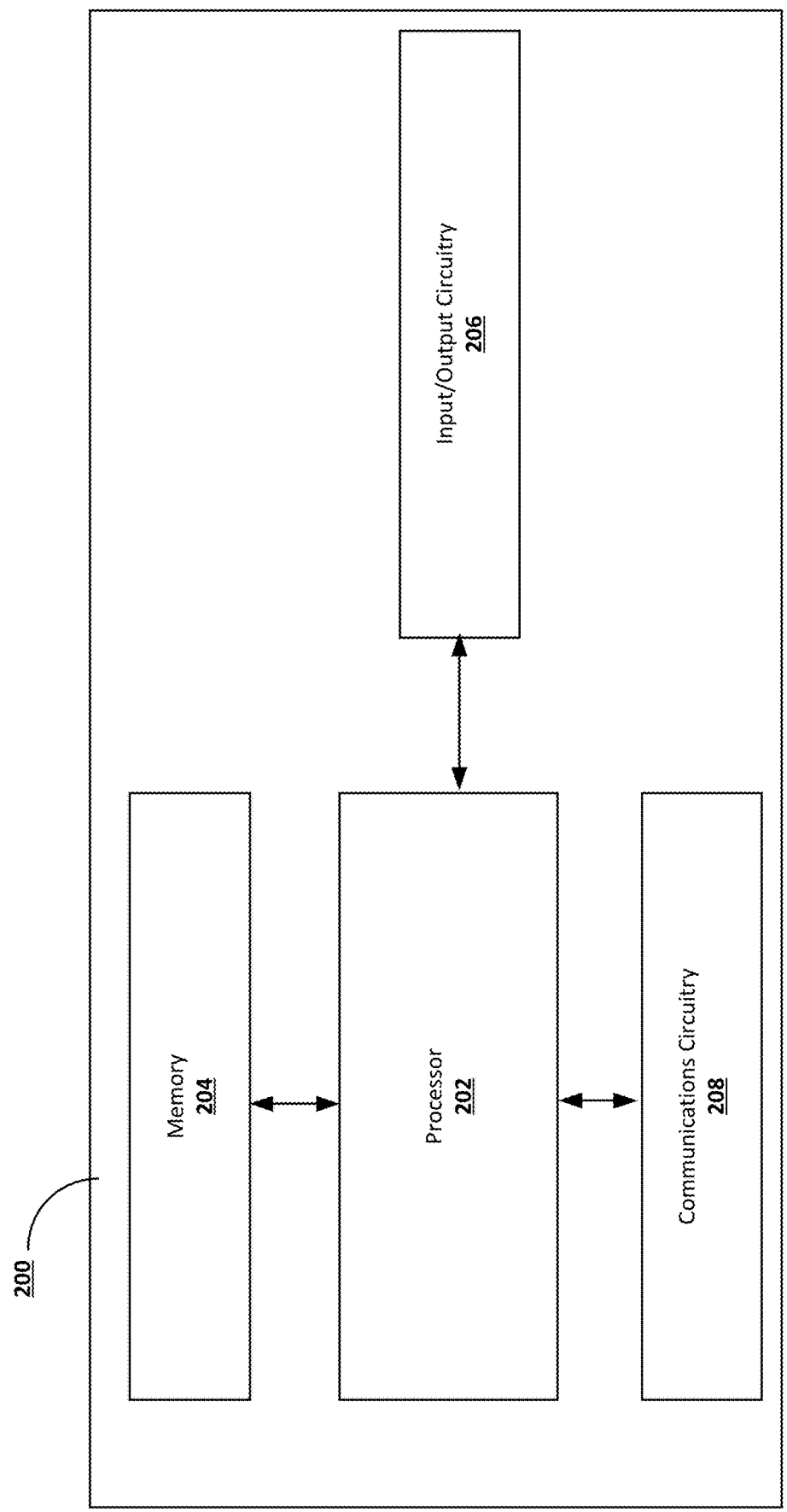
FIG. 2 is a block diagram of an example communication channel extraction and summary server computing device structured in accordance with at least some embodiments of the present invention.

The communication channel extraction and summary server computing device 106 may be embodied by one or more computing systems, such as apparatus 200 shown in FIG. 2. The apparatus 200 may include processor 202, memory 204, input/output circuitry 206, and communications circuitry 208. The apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Example Client Computing Device

Figure 3:
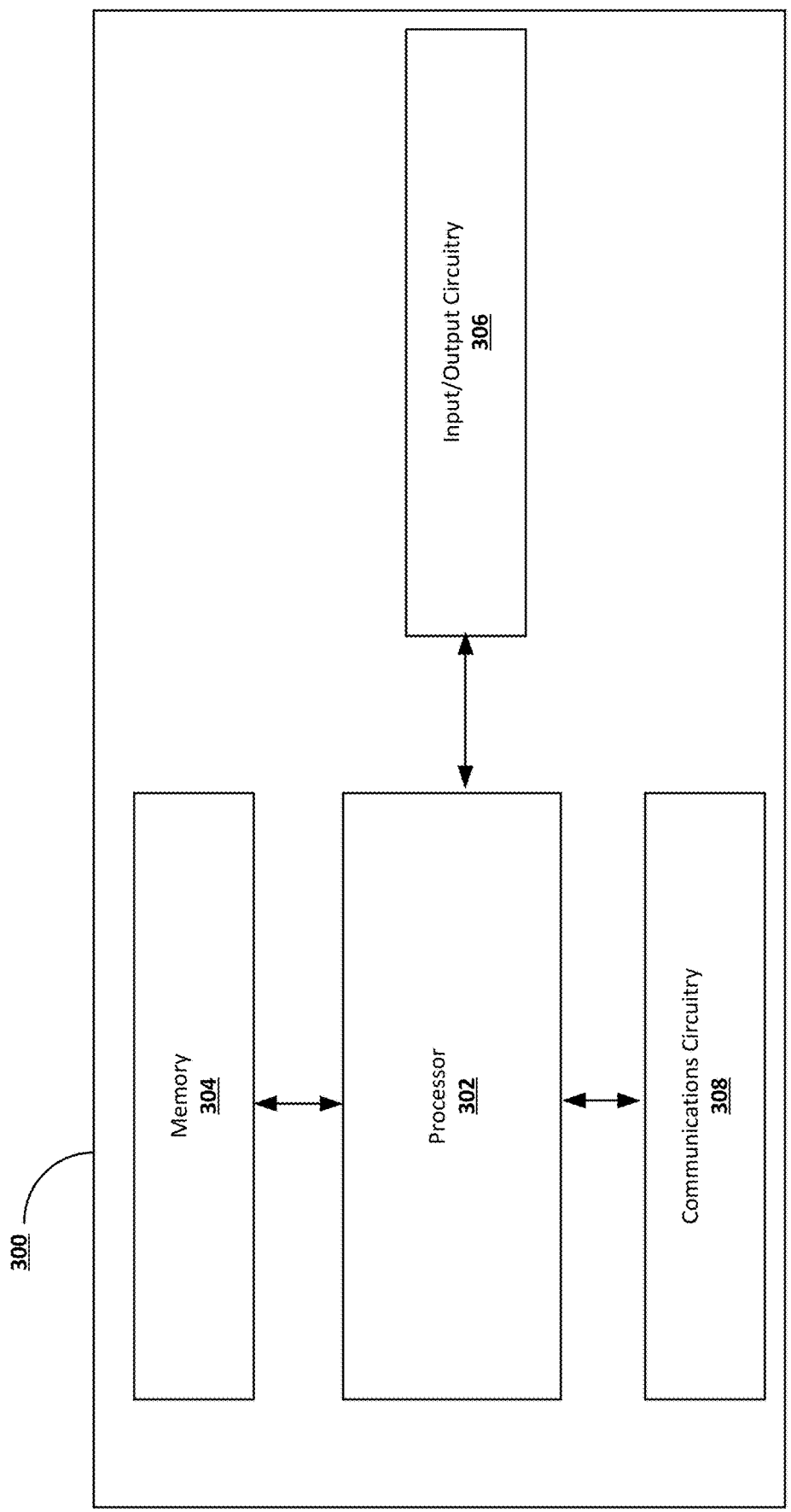
FIG. 3 is a block diagram of an example client computing device structured in accordance with at least some embodiments of the present invention.

Referring now to FIG. 3, a client computing device may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or coprocessor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a tablet mode), other input accessories such as tactile keyboards, track pads, mice, etc. In other embodiments in which the apparatus is embodied by a non-limited interaction device, the input/output circuitry 306 may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally, or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Exemplary Data Flows and Operations

Various embodiments of the present invention are directed to a communication channel extraction and summary server system that is configured to efficiently and reliably generate abstractive context summaries for multi-party communication channels. The below disclosed system is configured to extract communication data objects (e.g., discussion thread text and other context) from multi-party communication channels, analyze the communication data objects using natural language processing and/or text summarization machine learning models, generate abstractive context summaries for the multi-party communication channels, and present the abstractive context summaries to a member (e.g., by rendering the abstractive context summaries for display on a client computing device associated with the member) in response to one or more defined member events.

As noted above, communication channel extraction and summary server systems configured as disclosed herein produce a number of technical benefits. For example, the disclosed systems operate periodically in parallel to multi-party communication channel discussions and are thereby configured to render a low-latency abstractive context summary for a member immediately at the time that the member first accesses a multi-party communication channel or rejoins a multi-party communication channel after being away for a defined period of time. The disclosed system is further configured to reduce the computational expense needed for a member to get up to speed on both of the client and back-end server sides of the network. On the client side, the client computing device need only fetch and render abstractive context summary content and not content associated with numerous pages of discussion threads (e.g., numerous communication data objects). On the back-end server side, the back-end server can deliver/transmit isolated content associated with abstractive summaries for multiple multi-party communication channels accessed by a member rather than supporting page loads for endless scrolling by a member as the member attempts to get quickly up to speed with respect to a multi-party communication channel discussion.

Moreover, in example applications of various embodiments of the present invention, member events that trigger abstractive context summary rendering may also be tied to specific alerts and/or incidents. As the complexity of an incident rises or as more triage and repair workstreams come online, more multi-party communication channels may be created, making it more difficult for a new member/user to quickly gather important context and status information. Various embodiments of the present invention are directed to alleviating these issues by providing a communication channel extraction and summary server system that is configured to programmatically generate an abstractive context summary of the content of each multi-party communication channel that is associated with an alert or incident identifier.

Furthermore, communication channel extraction and summary server systems configured as disclosed herein are further configured to cause rendering of an abstractive context summary scheduling interface associated with a multi-party communication channel or selected multi-party communication channel(s) that is configured to allow an accessing member/user to define a summary generation parameter set (e.g., topics, keywords, date ranges) that is used to generate, build, and/or refine one or more abstractive context summaries. Such summary generation parameter sets may, for example, be used to define the scope of communication data objects that are extracted from the multi-party communication channels or otherwise used as inputs for the natural language processing and machine learning models.

While certain embodiments of the present invention are described with reference to abstractive context summary for multi-party communication channel associated with an incident, one or ordinary skill in the art will recognize that the disclosed concepts can be used to generate and present abstractive context summary of other types of content data.

In various embodiments, a multi-party communication channel is an electronic communication medium (e.g., electronic chat room) configured to enable a group of individuals (e.g., members) associated with the electronic communication medium to transmit communication data objects via the electronic communication medium, such that the transmitted communication data objects may be displayed on a respective client computing device of each individual of the group of individuals via a shared multi-party communication channel interface rendered on each respective client computing device. For example, the multi-party communication channel interface may be configured to display each transmitted communication data object by a member on the multi-party communication channel interface, such that each transmitted communication data object is visible on the shared multi-party communication channel interface. In various embodiments, a communication data object may describe a message (e.g., text data comprising one or more characters, one or more sentences, one or more paragraphs, and/or the like) shared (e.g. transmitted) among members/users of a multi-party communication channel via associated multi-party communication channel interface, wherein the messages are visible on the multi-party communication channel interface on client computing devices of each member. An example of a multi-party communication channel is a group chat.

In various embodiments, each communication data object may be associated with metadata, such as a timestamp (e.g., date and/or time) that describes when the corresponding communication data object was generated/transmitted (e.g. posted on the multi-party communication channel), a member profile identifier that uniquely identifies the member that generated the communication data object, and/or the like. In various embodiments, communication data objects of a multi-party communication channel are configured to be transmitted, received, and/or stored in accordance with embodiments of the present invention. The communication data objects of a multi-party communication channel may be configured to be transmitted between multiple computers and/or multiple servers, and such transmissions may pass through multiple relays, routers, network access points, base stations, hosts, and/or the like. Where a computing device is described herein to send communication data objects associated with one or more multi-party communication channels to another computing device, it will be appreciated that the communication data objects may be sent directly to another computing device or may be sent indirectly via one or more intermediary computing devices, such as using one or more servers, relays, routers, network access points, base stations, hosts, and/or the like.

Generating and Storing Abstractive Context Summaries

Figure 4:
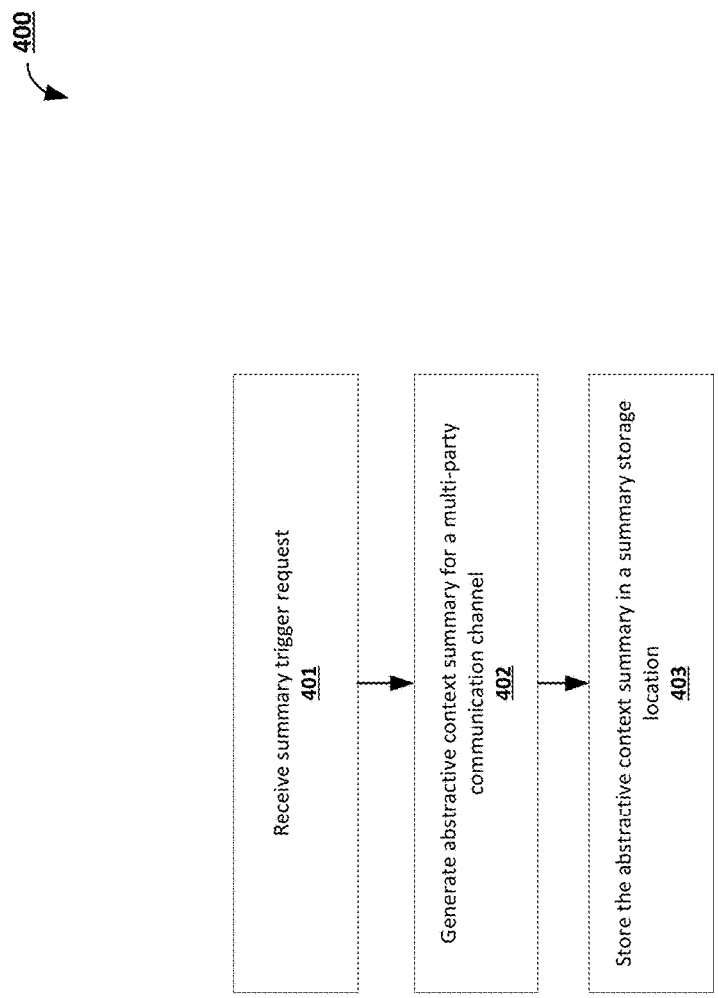
FIG. 4 is a flow chart diagram of an example process for storing abstractive context summaries for multi-party communication channels in accordance with at least some embodiments of the present invention.

FIG. 4 is an example process 400 for performing operations that are configured to generate and store abstractive context summaries for multi-party communication channels. Via the various operations of the process 400, the communication channel extraction and summary server computing device 106 can generate an abstractive context summary of the content of a multi-party communication channel and persistently store the generated abstractive context summaries, such that the most recent abstractive context summary for a multi-party communication channel may be retrieved in response to a defined member event for presentation to a member associated with the member event (e.g., rendered for display on a client computing device 102 associated with the member).

The process 400 begins at operation 401 when the communication channel server computing device 106 receives a summary trigger request associated with a multi-party communication channel identifier of one or more communication channel identifiers, wherein each communication channel identifier uniquely identifies a particular multi-party communication channel of a plurality of multi-party communication channels. The summary trigger request may describe a request to generate an abstractive context summary of the content of a multi-communication channel, and may include the multi-party communication identifier for the noted multi-party communication channel.

In some embodiments, the communication channel server computing device 106 receives the summary trigger request using the text extractor unit 113. In some embodiments, the summary trigger request is generated by the trigger summary request scheduler unit 112 and communicated (e.g., transmitted) by the trigger summary request scheduler unit 112 to the text extractor unit 113.

In various embodiments, the trigger summary request scheduler unit 112 is configured to generate and transmit a trigger summary request for a multi-party communication channel of a plurality of multi-party communications channels. In some embodiment, the trigger summary request scheduler unit 112 is configured to generate and transmit a trigger summary request for each multi-party communication channel of the plurality of multi-party communications channels. In some embodiments, the trigger summary request scheduler unit 112 is configured to generate and transmit a trigger summary request for a multi-party communication channel of the plurality of multi-party communication channels based on one or more trigger request criteria In example embodiments where the summary request scheduler 112 is configured to generate and transmit a trigger summary request for each multi-party communication channel of the plurality of multi-party communication channels, the trigger summary request scheduler unit 112 may generate and transmit summary trigger requests for the multi-party communication channels in accordance with one or more scheduling schemes. For example, in some embodiments, the trigger summary request scheduler unit 112 is configured to generate and transmit a trigger summary request for each multi-party communication channel of the plurality of multi-party communication channels to the text extractor unit 113 periodically, such as at predefined intervals/fixed unit of time (e.g., every 5 minutes, every 30 minutes, every hour, every 24 hours, and/or the like). Accordingly, in some embodiments, the communication channel server computing device 106 may generate a plurality of abstractive context summaries for a multi-party communication channel over a period of time (e.g., during a period where the multi-party communication channel is active).

In example embodiments, where the trigger summary request scheduler unit 112 is configured to generate and transmit a trigger summary request for a multi-party communication channel of the plurality of multi-party communication channels based on one or more trigger request criteria, the trigger summary request scheduler unit 112 may generate and transmit summary trigger requests for multi-party communication channels that satisfy the one or more trigger request criteria in accordance with one or more scheduling schemes. For example, in some embodiments, the trigger summary request scheduler unit 112 is configured to generate and transmit a trigger summary request for each multi-party communication channels of the plurality of multi-party communication channels that satisfy the one or more trigger request criteria to the text extractor unit 113 periodically, such as at predefined intervals/fixed unit of time (e.g., every 5 minutes, every 30 minutes, every hour, every 24 hours, and/or the like). For example, the trigger summary request scheduler unit 112 may transmit trigger summary requests for only multi-party communication channels that satisfy the one or more trigger request criteria. Accordingly, as noted above, in some embodiments, the communication channel server computing device 106 may generate a plurality of abstractive context summaries for a multi-party communication channel over a period of time (e.g., during a period where the multi-party communication channel is active).

In some embodiments, the one or more trigger request criteria may comprise a designator such as a priority indicator, such that the summary request scheduler unit 112 generates and transmits trigger summary requests to the text extractor unit 113 for multi-party communication channels that are associated with the designator (e.g., priority indicator). A priority indicator may describe an importance level of a multi-party communication channel. Using the Jake Incident Manager example for illustration, in some examples a multi-party communication channel may be associated with a priority indicator if the multi-party communication channel is associated with an incident (e.g., if the multi-party communication channel was generated in response to an incident alert). For example, a multi-party communication channel may be associated with a priority indicator if the multi-party communication channel is associated with an incident identifier, wherein an incident identifier uniquely identifies an incident and/or incident alert of a plurality of incidents and/or incident alerts.

In some other examples, a multi-party communication channel may be associated with a priority indicator if the multi-party communication channel is associated with an incident with a severity level (e.g., the criticalness of the incident/issue) that exceeds a predefined threshold. For example, in the noted example, a multi-party communication channel may be associated with a priority indicator if the multi-party communication channel is associated with an incident identifier and an incident severity level that exceeds a defined incident severity threshold.

At operation 402, the communication channel extraction and summary server computing device 106 generates an abstractive context summary for a multi-party communication channel based on the multi-party communication channel identifier associated with the summary trigger request. For example, in various embodiments, the communication channel extraction and summary server computing device 106 may be configured to generate an abstractive context summary for selected multi-party communication channels, wherein a multi-party communication channel may be selected based on the multi-party communication channel identifier associated with the multi-party communication channel.

In some embodiments, in response to receiving a summary trigger request, the communication channel extraction and summary server computing device 106 identifies the multi-party communication channel identifier associated with the summary trigger request and selects the multi-party communication channel associated with the multi-party communication channel identifier. In some embodiments, in response to receiving a summary trigger request, the communication channel extraction and summary server computing device 106 identifies the multi-party communication channel identifier associated with the summary trigger request and selects the multi-party communication channel associated with the multi-party communication channel identifier if the identified multi-party communication channel satisfies one or more channel selection criteria. In some embodiments, the one or more channel selection criteria may be different from the one or more trigger request criteria (described above). In some embodiments, the one or more channel selection criteria may be the same as the one or more trigger request criteria. For example, the one or more channel selection criteria may be association with a priority indicator (as describe above), wherein the identified multi-party communication channel may satisfy the one or more channel selection criteria if the multi-party communication channel is associated with a priority indicator.

Figure 5:
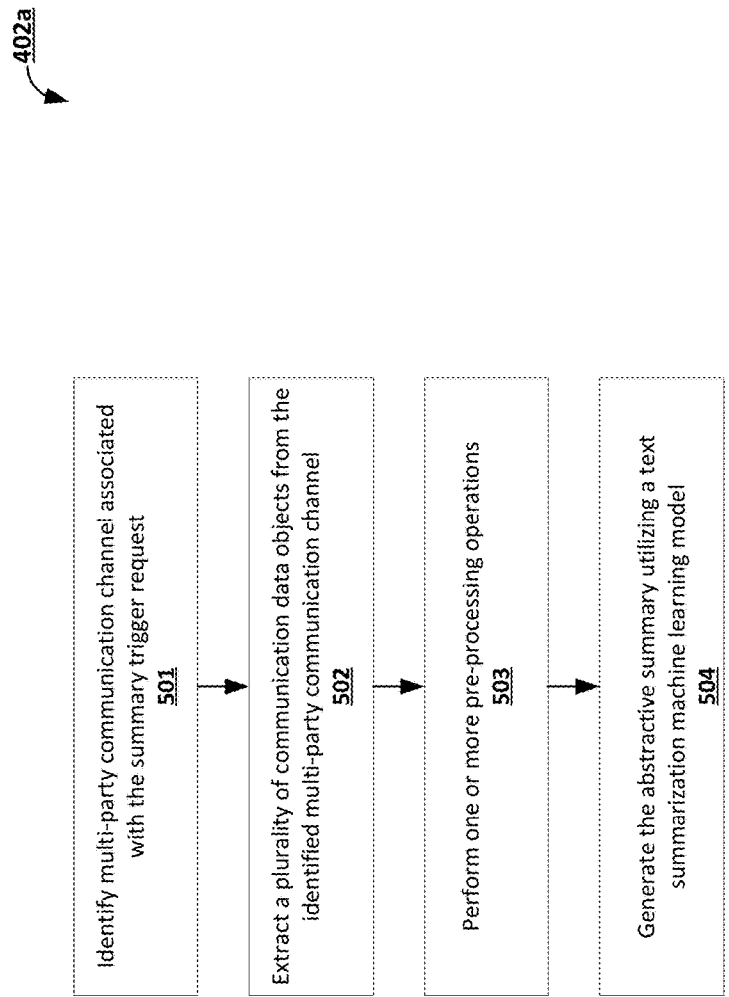
FIG. 5 is a flow chart diagram of an example process for generating an abstractive context summary for a multi-party communication channel in accordance with at least some embodiments of the present invention.

In some embodiments, operation 402 may be performed in accordance with the process that is depicted in FIG. 5, which is an example process for generating an abstractive context summary in response to a summary trigger request.

The process that is depicted in FIG. 5 begins at operation 501 when the communication channel extraction and summary server computing device 106 identifies the multi-party communication channel associated with the summary trigger request based on the multi-party communication channel identifier associated with the summary trigger request, and selects the identified multi-party communication channel. In some embodiments, the communication channel extraction and summary server computing device 106 may identify and select the corresponding multi-party communication channel using the text extractor unit 113.

At operation 502, the communication channel extraction and summary server computing device 106 extracts communication data objects (e.g., a plurality of communication data objects) from the selected multi-party communication channel. In some embodiments, the communication channel extraction and summary server computing device 106 is configured to extract each communication data objects associated with the selected multi-party communication channel. Additionally, in some embodiments, the communication channel extraction and summary server computing device 106 is configured to extract metadata (e.g., timestamp, member name, member identifier, and/or the like) associated with the communication data objects. In some embodiments, the communication channel extraction and summary server computing device 106 extracts the communication data objects using the text extractor unit 113.

In some embodiments, extracting communication data objects within a multi-party communication channel comprises extracting the content of the multi-party communication channel and determining/identifying communication data objects within the content data of the multi-party communication channel. For example, in some embodiments, the communication channel extraction and summary server computing device 106, using the text extractor unit 113, extracts the content data of the multi-party communication channel and parses the extracted content data to identify and extract communication data objects. In some embodiments, the communication data objects may be extracted using an extraction machine learning model that is trained to identify communication data objects within a multi-party communication channel.

At operation 503, the communication channel extraction and summary server computing device 106 performs one or more preprocessing operations. In some embodiments, the one or more preprocessing operations comprise parsing the extracted communication data objects and/or removing noise from the extracted communication data objects to output text data (e.g., preprocessed communication data objects) that may be provided as input text to a text summarization machine learning model to process in order to generate an abstractive context summary. In some embodiments, the communication channel extraction and summary server computing device 106 performs the one or more preprocessing operations using the preprocessor unit 114, wherein the preprocessor unit 114 may be configured to parse the extracted communication data objects to generate as output text data that may be provided as input to the text summarization machine learning model 124 (as described above). In some embodiments, parsing the extracted communication data objects comprises the removal of unnecessary punctuations or token, weblinks, and other unnecessary aspects and/or noise of the content data.

At operation 504, the communication channel extraction and summary server computing device 106 generates an abstractive context summary for the selected multi-party communication channel using a text summarization machine learning model. In various embodiments, in response to generating input text (e.g., preprocessed communication data objects) using the preprocessor unit 114 and based on the extracted communication data objects, the communication channel extraction and summary server computing device 106, using a text summarization machine learning model, processes the text input (e.g., preprocessed communication data objects) to generate an abstractive context summary for the multi-party communication channel. For example, the preprocessor unit 114 may provide as input to a text summarization machine learning model, such as text summarization machine learning model 124, wherein the text summarization machine learning model is configured to receive the preprocessed communication data object as input and process the received communication data objects to generate as output an abstractive context summary for the selected multi-party communication channel.

Figure 6:
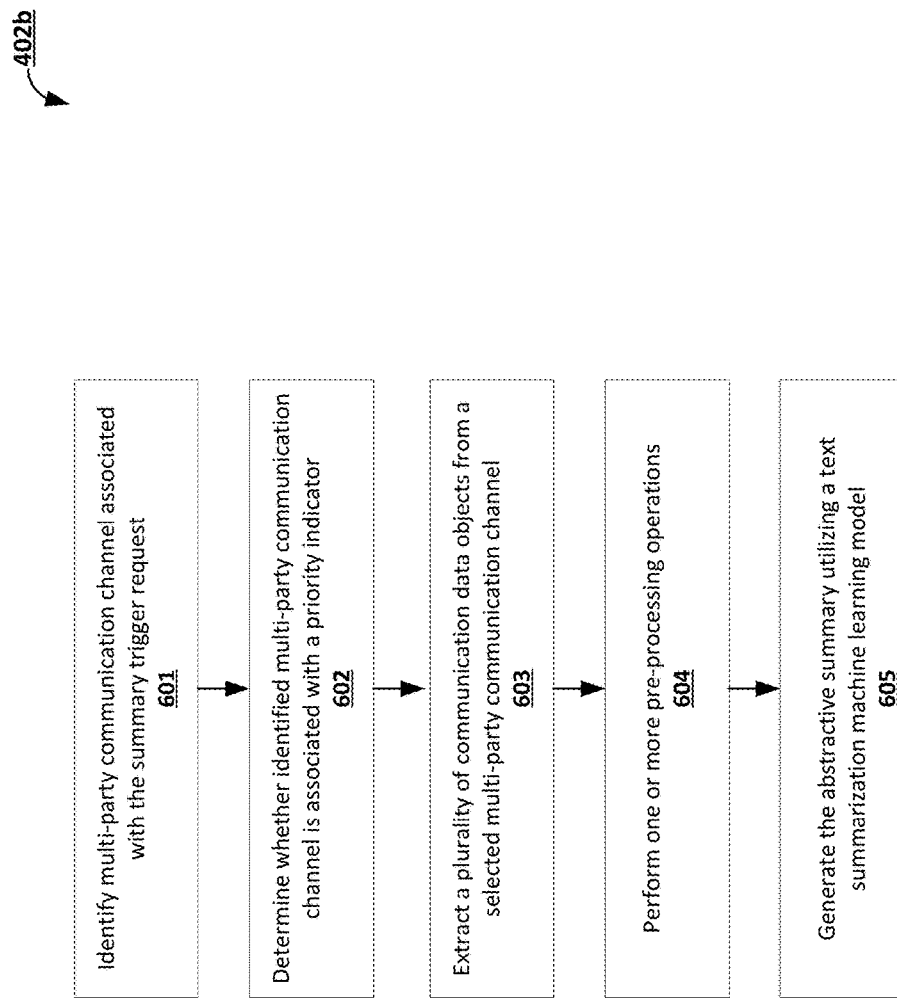
FIG. 6 is a flow chart diagram of another example process for generating an abstractive context summary for a multi-party communication channel in accordance with at least some embodiments of the present invention.

In some embodiments, operation 402 may be performed in accordance with the process that is depicted in FIG. 6, which is another example process for generating an abstractive context summary in response to a summary trigger request. The process that is depicted in FIG. 6 begins at operation 601 when the communication channel extraction and summary server computing device 106 identifies the multi-party communication channel associated with the summary trigger request based on the multi-party communication channel identifier associated with the summary trigger request. In some embodiments, the communication channel extraction and summary server computing device 106 may identify the corresponding multi-party communication channel using the text extractor unit 113.

At operation 602, the communication channel extraction and summary server computing device 106 determines whether the identified multi-party communication channel satisfies one or more channel selection criteria. As described above, in some embodiments, for each summary trigger request transmitted by the trigger summary request scheduler unit 112 and received by the text extractor unit 113, the communication channel extraction and summary server computing device 106, using the text extractor unit 113, may determine whether the respective trigger summary request is associated with a multi-party communication channel that satisfies the one or more channel selection criteria and select the multi-party communication channel if it satisfies the one or more channel selection criteria. In some embodiments, the one or more channel selection criteria includes association with a priority indicator (as described above), wherein the communication channel extraction and summary server computing device 106 determines whether the identified multi-party communication channel (e.g., from operation 501) is associated with a priority indicator and selects the identified multi-party communication channel if determined to be associated with a priority indicator in order to generate an abstractive summary for the selected multi-party communication channel.

At operation 603, the communication channel extraction and summary server computing device 106 extracts communication data objects (e.g., a plurality of communication data objects) from the selected multi-party communication channel. In some embodiments, the communication channel extraction and summary server computing device 106 is configured to extract each communication data objects associated with the selected multi-party communication channel. Additionally, in some embodiments, the communication channel extraction and summary server computing device 106 is configured to extract metadata (e.g., timestamp, member name, member identifier, and/or the like) associated with the communication data objects. In some embodiments, the communication channel extraction and summary server computing device 106 extracts the communication data objects using the text extractor unit 113.

In some embodiments, extracting communication data objects within a multi-party communication channel comprises extracting the content of the multi-party communication channel and determining/identifying communication data objects within the content data of the multi-party communication channel. For example, in some embodiments, the communication channel extraction and summary server computing device 106, using the text extractor unit 113, extracts the content data of the multi-party communication channel and parses the extracted content data to identify and extract communication data objects. In some embodiments, the communication data objects may be extracted using an extraction machine learning model that is trained to identify communication data objects within a multi-party communication channel.

At operation 604, the communication channel extraction and summary server computing device 106 performs one or more preprocessing operations. In some embodiments, the one or more preprocessing operations comprise parsing the extracted communication data objects and/or removing noise from the extracted communication data objects to output text data (e.g., preprocessed communication data objects) that may be provided as input text to a text summarization machine learning model to process in order to generate an abstractive context summary. In some embodiments, the communication channel extraction and summary server computing device 106 performs the one or more preprocessing operations using the preprocessor unit 114, wherein the preprocessor unit 114 may be configured to parse the extracted communication data objects to generate as output text data that may be provided as input to the text summarization machine learning model 124 (as described above). In some embodiments, parsing the extracted communication data objects comprises the removal of unnecessary punctuations or token, weblinks, and other unnecessary aspects and/or noise of the content data.

At operation 605, the communication channel extraction and summary server computing device 106 generates an abstractive context summary for the selected multi-party communication channel using a text summarization machine learning model. In various embodiments, in response to generating input text (e.g., preprocessed communication data objects) using the preprocessor unit 114 and based on the extracted communication data objects, the communication channel extraction and summary server computing device 106, using a text summarization machine learning model, processes the text input (e.g., preprocessed communication data objects) to generate an abstractive context summary for the multi-party communication channel. For example, the preprocessor unit 114 may provide as input to a text summarization machine learning model, such as text summarization machine learning model 124, wherein the text summarization machine learning model is configured to receive the preprocessed communication data object as input and process the received communication data objects to generate as output an abstractive context summary for the selected multi-party communication channel.

Example Text Summarization Machine Learning Model

The communication channel extraction and summary server computing device may utilize a variety of text summarization machine learning models configured and/or otherwise suitable for generating an abstractive context summary of the content of a multi-party communication channel. As an example, in some embodiments, to generate an abstractive context summary using an example text summarization machine learning model, the communication channel extraction and summary server computing device 106 may generate multi-party communication channel input batches of the preprocessed communication data objects. In some embodiments, the preprocessed communication data objects are chunked according to an input size limit hyper-parameter of a text summarization machine learning model in order to generate multi-party communication channel input batches. A multi-party communication channel input batch may be a batch (or group) of input tokens (e.g., batch/group of preprocessed communication data objects) that are provided as an input to a text summarization machine learning model, such as the Text-To-Text Transfer Transformer (T5) model, wherein each batch of input tokens is extracted from within the preprocessed communication data objects.

The multi-party communication channel input batches may be processed by a text summarization machine learning model to generate an abstractive context summary of the communication data objects. The multi-party communication channel input batches of a multi-party communication channel may be limited by the size-qualifying subset threshold. In some embodiments, machine learning models have limits for size of tokens that are provided as inputs to those models, where those limits are defined by input size limit hyper-parameters of those models. Thus, when the size of the content data (communication data objects) corresponding to a multi-party communication channel exceeds the input size limit hyper-parameter of a model that is used to generate an abstractive context summary for a multi-party communication channel, then the communication data objects may be divided into two or more multi-party communication channel input batches that are provided to the model during one processing iteration.

In some embodiments, the input size limit hyper-parameter is an input token limit of a text summarization machine learning model. The input size limit hyper-parameter may be stored as part of the configuration data for a corresponding text summarization machine learning model on a storage subsystem associated with a communication channel extraction and summary server computing device. For example, in some embodiments, the input size limit hyper-parameter for the T5 text summarization machine learning model may be 512, such that the T5 text summarization machine learning model may during each processing iteration only process an input text (e.g., communication data objects) up to a size of 512 tokens. As another example, in some embodiments, the input size limit hyper-parameter for a first variant of the pre-training with extracted gap-sentences (Pegasus) text summarization machine learning model may be 512, such that the first variant of the Pegasus text summarization machine learning model may during each processing iteration only process an input text (e.g., communication data objects) up to a size 512 tokens. As yet another example, in some embodiments, the input size limit hyper-parameter for a second variant of the Pegasus text summarization machine learning model may be 1024, such that the second variant of the Pegasus text summarization machine learning model may during each processing iteration only process an input text (e.g., communication data objects) up to a size of 1024 tokens. As a further example, in some embodiments, the input size limit hyper-parameter for a third variant of the Pegasus text summarization machine learning model may be 2048, such that the third variant of the Pegasus text summarization machine learning model may during each processing iteration only process an input text (e.g., communication data objects) up to a size of 2048 tokens.

Once generated, the multi-party communication channel input batches are provided to the text summarization machine learning model in accordance with a batch processing operation sequence in order to generate a summary for the multi-party communication channel. In some embodiments, the multi-party communication channel input batches are processed by the text summarization machine learning model based on the corresponding ordering within the multi-party communication channel, where the ordering may be based on the timestamp associated with each communication data object. For instance, where the communication data objects are divided into two multi-party communication channel input batches, the first multi-party communication channel input batch may comprise communication data objects that precede communication data objects of the second multi-party communication channel input batch, and the first multi-party communication channel input batch may be processed by the same text summarization machine learning model before the multi-party communication channel input batch corresponding to the second multi-party communication channel input batch.

The communication channel extraction and summary server computing device 106 performs a batch processing operation sequence by providing each multi-party communication channel input batch to a text summarization machine learning model to generate a set of model outputs corresponding to the batch processing operation sequence. Each batch processing operation in the batch processing operation sequence may include processing a corresponding multi-party communication channel input batch by the text summarization model to generate a model output for the batch processing operation in the batch processing operation sequence. In some embodiments, the abstractive context summary for the multi-party communication channel is determined based on at least one of the model outputs generated for the batch processing operation sequence, for example based on a final model output for a final batch processing operation in the batch processing operation sequence, or based on all of the model outputs generated for all of the batch processing operations in the particular batch processing operation sequence.

In some embodiments, the text summarization machine learning model is an attention-based transformer text summarization machine learning model. In some embodiments, the attention-based transformer text summarization machine learning model comprises a text-to-text transfer transformer model. In some embodiments, the attention-based transformer text summarization machine learning model comprises a pre-training with extracted gap-sentences for abstractive summarization model. As a non-limiting example, an attention-based transformer text summarization machine learning model may comprise a multi-party communication channel segmentation layer, where the multi-party communication channel segmentation layer is configured to process a multi-party communication channel in order to generate a batch processing operation sequence that includes multi-party communication channel input batches. To do so, the multi-party communication channel segmentation layer uses an input size limit hyper-parameter. Additionally, the attention-based transformer text summarization machine learning model may comprise an attention-based processing layer, where the attention-based processing layer is configured to process batch processing operation sequence for the multi-party communication channel during a set of processing iterations. In particular, the attention-based processing layer may be configured to process, at each processing iteration, a multi-party communication channel input batch in order to generate a model output, which correspond to the multi-party communication channel input batch. To do so, the attention-based processing layer may use a multi-party communication channel-wide context weight vector.

Additionally, the attention-based transformer text summarization machine learning model may comprise an output aggregation layer, where the output aggregation layer is configured to generate the abstractive multi-party communication channel based on the model outputs generated by the attention-based processing layer, which correspond to the multi-party communication channel input batch. To do so, the output aggregation layer may use an output aggregation model that describes guidelines for merging model outputs to generate the abstractive context summary for the multi-party communication channel. The communication channel extraction and summary server computing device 106 generates the summary for the multi-party communication channel based on the model outputs created by the text summarization machine learning model. As described above, the abstractive context summary for the multi-party communication channel may be generated based on at least one of the model outputs generated by the batch processing operation sequence. For example, in some embodiments, the abstractive context summary for the multi-party communication channel may be generated based on a final model output for a final batch processing operation in the batch processing operation sequence. As another example, in some embodiments, the multi-party communication channel summary may be generated based on all of the model outputs generated for all of the batch processing operations in the batch processing operation sequence.

Returning to FIG. 4 at operation 403, the communication channel extraction and summary server computing device 106 stores the generated abstractive context summary in a summary storage location associated with the multi-party communication channel. In some embodiments, in response to generating the abstractive context summary, the communication the summary extractor unit 116 receives the generated abstractive context summary and stores (e.g., persistently stores) the generated abstractive context summary in a summary storage location associated with the multi-party communication channel.

In some embodiments, the communication channel extraction and summary server computing device 106 may store each abstractive context summary generated for a plurality of communication channels in the same summary storage location. In some embodiments, the communication channel extraction and summary server computing device 106 may store each abstractive context summary generated for a multi-party communication channel in a summary storage location dedicated to the multi-party communication channel. In some embodiments, the communication channel extraction and summary server computing device 106 may store each abstractive context summary generated for a multi-party communication channel in a summary storage location dedicated to a subset of multi-party communication channel that includes the respective multi-party communication channel. In some embodiments, the communication channel extraction and summary server computing device 106 may associate each stored abstractive summaries with a corresponding multi-party communication channel identifier, such that an abstractive context summary for a multi-party communication channel may be retrieved from the summary storage location based on the multi-party communication channel identifier.

As described above, abstractive context summaries may be generated for a multi-party communication channel periodically. In some embodiments, a generated abstractive context summary for a multi-party communication channel may be stored (e.g., persistently stored) in a summary storage location associated with the multi-party communication channel. In some embodiments, in response to storing a generated abstractive context summary for a multi-party communication channel in a summary storage location associated with the multi-party communication channel, older abstractive context summary or summaries of the multiparty communication channel stored in the summary storage location associated with the multi-party communication channel may be removed and/or replaced. For example, in some embodiments, the summary storage location associated with a multi-party communication channel may comprise each generated abstractive context summaries for the multi-party communication channel, in some embodiments, the summary storage location associated with a multi-party communication channel may comprise only the most recent generated abstractive context summaries for the multi-party communication channel, and in some embodiments, the summary storage location associated with a multi-party communication channel may comprise a subset of abstractive context summaries that comprise the most recent generated abstractive context summaries for the multi-party communication channel (e.g., last X abstractive context summaries generated for a multi-party communication channel).

In some embodiments, the communication channel extraction and summary server computing device 106 may retrieve a stored abstractive context summary from the summary storage location for presentation to a client computing device of a member associated with the multi-party communication channel. In some embodiments, the communication channel extraction and summary server computing device 106 may retrieve a stored abstractive context summary from the summary storage location, using the summary extractor unit 116 in response to one or more events (e.g., member events), and provide/transmit the retrieved abstractive context summary to a client computing device associated with a member associated with the event.

Presenting Abstractive Context Summaries

Figure 7:
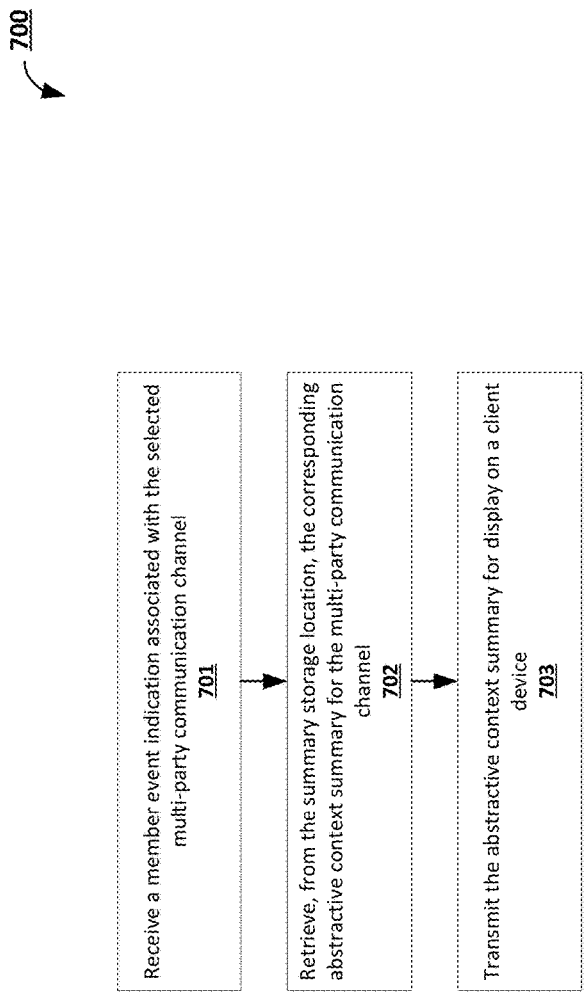
FIG. 7 is a flow chart diagram of an example process for rendering an abstractive context summary for display on a client computing device in accordance with at least some embodiments of the present invention.

FIG. 7 is a flowchart diagram of an example process 700 for transmitting an abstractive context summary to a client computing device for display on the client computing device (e.g., rendering an abstractive context summary for display on a client computing device).

The process 700 begins at operation 701 when the client computing device 102 identifies and/or receives a member event indication associated with a multi-party communication channel. A member event indication may be generated with respect to a multi-party communication and a particular member, and may indicate the occurrence of an event with respect to the particular member. Examples of such member events include member join event, member rejoin event, delayed access event, and/or other events. In some embodiments, a member join event with respect to a particular multi-party communication channel may describe the first time a member (e.g., new member) joins the particular multi-party channel. In some embodiments, a member rejoin event with respect to a particular multi-party communication channel may describe an occurrence where an existing member joins the multi-party communication channel after leaving the multi-party communication channel for a period of time that exists a defined threshold (e.g., when an existing member logs off and logs back on after more than X amount of time). In some embodiments, a delayed-access event with respect to a multi-party communication channel may describe an occurrence were access to the multi-party communication channel for a corresponding member is delayed (e.g., access to the multi-party communication channel is granted outside of a defined time range).

The communication channel extraction and summary server computing device 106 may be configured to receive member event indications from one or more external server computing devices associated with the multi-party communication channels. For example, the communication channel extraction and summary server computing device 106 may receive member event indications (e.g., member event notifications) from a server computing device supporting and/or hosting the multi-party communication channels, wherein a member event indication may comprise a message, signal, and/or the like, transmitted from the noted server computing device to the communication channel extraction and summary server computing device 106. In some embodiments, the communication channel extraction and summary server computing device 106 may receive the member event indication using the summary extractor unit 116, wherein the member event indication may be associated with a multi-party communication channel of a plurality of multi-party communication channels, as well as associated with a member identifier of a plurality of member identifiers. In some embodiments, upon receiving the member event indication, the communication channel extraction and summary server computing device 106, using the summary extractor unit 116, identifies/determines the multi-party channel identifier associated with the member event indication and the member identifier associated with the member event indication.

At operation 702, the communication channel extraction and summary server computing device 106 retrieves from a summary storage location, based on the multi-party channel identifier associated with the member event, the abstractive context summary for the multi-party communication channel associated with the multi-party communication channel identifier, wherein the retrieved abstractive context summary may be the most recent abstractive context summary stored in the summary storage location for the multi-party communication channel. For example, in some embodiments, retrieving the abstractive context summary for the multi-party communication channel from the summary storage location may include identifying, from one more abstractive context summaries stored in the summary storage location, an abstractive context summary associated with the multi-party communication identifier for the multi-party communication channel and retrieving the identified abstractive context summary.

Additionally, in some embodiments, retrieving the abstractive context summary for the multi-party communication channel from the summary storage location may include identifying the most recent abstractive context summary for the multi-party communication channel in the summary storage location (e.g., in example embodiments where multiple abstractive context summaries of a multi-party communication channel are stored in the summary storage location).

In some embodiments, retrieving the abstractive context summary for a multi-party communication channel may include determining whether the multi-party communication channel satisfies one or more summary retrieval criteria, wherein an abstractive context summary is retrieved for a multi-party communication channel if the multi-party communication channel satisfies the one or more summary retrieval criteria. In some embodiments, the one or more summary retrieval criteria may be the same as the one or more channel selection criteria (described above). For example, in some embodiments, the one or more summary retrieval criteria may be association with a priority indicator (as described above). For example, in some embodiments, the communication channel extraction and summary server computing device 106 determines whether the multi-party communication channel is associated with a priority indicator, and retrieves corresponding abstractive context summary for the multi-party communication channel in response to determining that the multi-party communication channel is associated with a priority indicator. Accordingly, in some embodiments, the communication channel extraction and summary server computing device 106 may retrieve abstractive context summaries for only multi-party communication channels associated with a priority indicator.

At operation 703, the communication channel extraction and summary server computing device 106 transmits the retrieved abstractive context summary to a client computing device associated with the member profile identifier associated with the member event indication for display on the client computing device. In some embodiments, the retrieved abstractive context summary may be transmitted and/or rendered on the client computing device as an ephemeral abstractive context summary, such that the abstractive context summary is visible on the shared multi-party communication channel interface on the client computing device associated with the member profile identifier, but not on the shared multi-party communication channel interface on the client computing device associated with other member profile identifiers.

Figure 8:
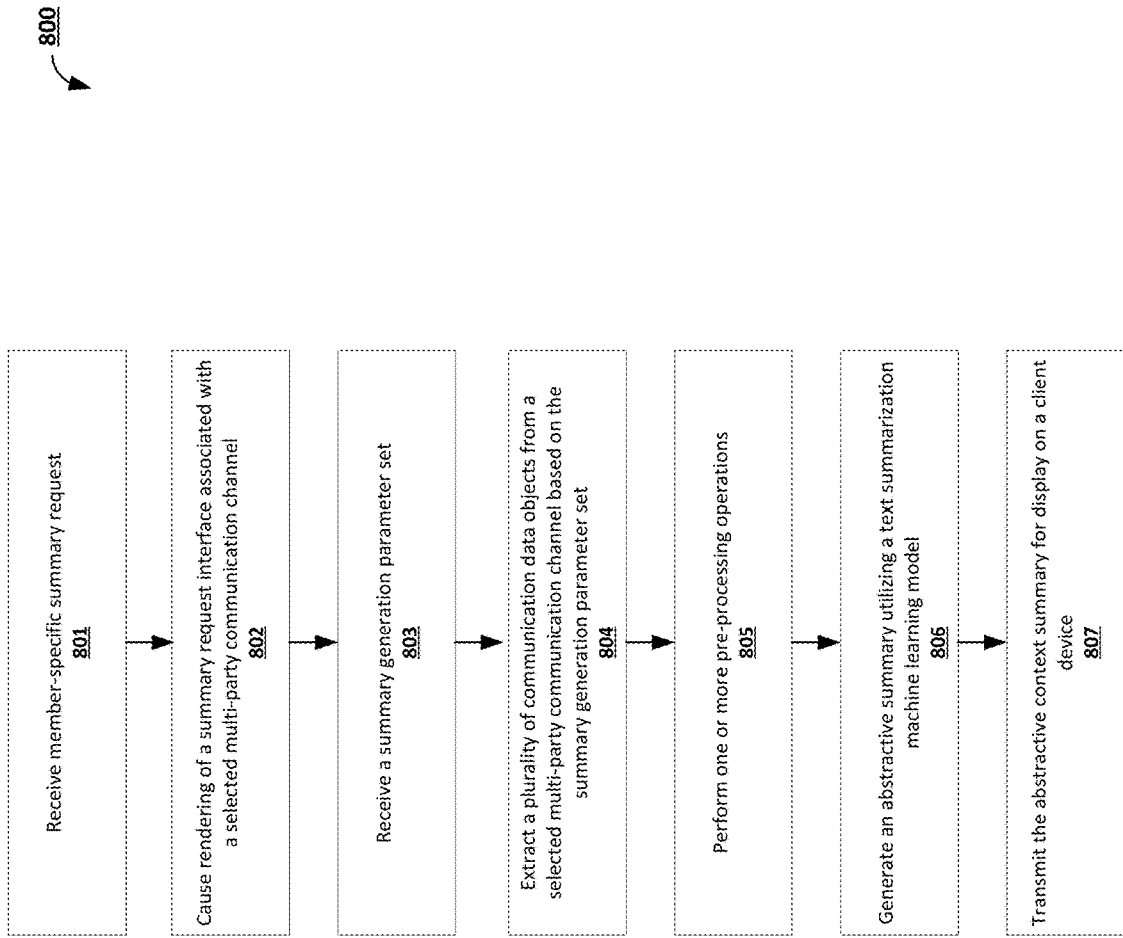
FIG. 8 is a flow chart diagram of another example process for generating a customized abstractive context summary for a multi-party communication channel in accordance with at least some embodiments of the present invention.

Rendering Abstractive Context Summary Scheduling Interface And Generating Customized Abstractive Context Summaries In some embodiments, the communication channel extraction and summary server computing device 106 may be configured to generate a customized abstractive context summary. In various embodiments, a customized abstractive summary may describe a member-specific abstractive context summary, wherein the customized abstractive context summary is generated for a particular member in response to a request initiated by the member. FIG. 8 is a flowchart diagram of an example process 800 for performing operations that are configured to generate and transmit a customized abstractive context summary to a client computing device. Via the various operations of the process 800, the communication channel extraction and summary server computing device 106 can cause rendering of an abstractive context summary scheduling interface and generate a customized abstractive context summary based on one or more parameters received via the abstractive context summary scheduling interface.

The process 800 begins at operation 801 when the communication channel extraction and summary server computing device 106 receives a customized summary request, wherein the customized summary request may be associated with a member profile identifier and a multi-party communication channel identifier. In various embodiments, a customized summary request may be a request received from a member associated with a multi-party communication channel of a plurality of multi-party communication channels to generate a customized abstractive context summary of the multi-party communication.

In some embodiments, the customized summary request of a multi-party communication channel may be generated in response to interaction (e.g., by the corresponding member) with a customized summary request interface element (e.g., "request customized summary" button) of the multi-party communication channel interface, wherein the customized summary request interface element may be configured to enable/allow a member to request a customized abstractive context summary for the multi-party communication channel (e.g., by clicking the customized summary request interface element) of the plurality of communication channels. In some embodiments, the communication channel extraction and summary server computing device 106, using the custom summary request generator unit 117, may be configured to receive the customized summary request.

In some embodiments, each multi-party communication channel of the plurality of multi-party communication channels may be associated with a multi-party communication channel interface that comprises a customized summary request interface element. In some embodiments, a multi-party communication channel subset of the plurality of multi-party communication channels may comprise a customized summary request interface element. In some embodiments, the noted multi-party communication channel subset may comprise multi-party communication channels associated with a priority indicator.

At operation 802, the communication channel extraction and summary server computing device 106 causes rendering of an abstractive context summary scheduling interface associated with a selected multi-party communication channel to a client computing device associated with the member profile identifier.

In some embodiments, in response to receiving a customized summary request, the communication channel extraction and summary server computing device 106 identifies/determines the multi-party communication channel associated with the multi-party communication channel identifier associated with the customized summary request, and selects the multi-party communication channel. In some embodiments (such as where each multi-party communication channel comprises a customized summary request interface element), in response to receiving a customized summary request, the communication channel extraction and summary server computing device 106 may identify/determine the multi-party communication channel associated with the multi-party communication channel identifier and determine whether the identified multi-party communication channel is associated with a priority indicator, wherein the communication channel extraction and summary server computing device 106 selects the multi-party communication channel if the multi-party communication channel is associated with a priority indicator.

In some embodiments, the communication channel extraction and summary server computing device 106 may receive summary generation parameters (e.g., a summary generation parameter set) via the abstractive context summary scheduling interface. For example, the abstractive context summary scheduling interface may include one or more abstractive context summary scheduling interface elements that enables a member to provide summary generation parameters (e.g., a keyword, a date, a date range, a time range, and or the like), wherein the communication channel extraction and summary server computing device 106 may generate a customized abstractive context summary based on the one or more summary generation parameters. In some embodiments, the one or more abstractive context summary scheduling interface elements may include text fields, selectable objects (e.g., icons), drop down box, date picker, timer picker, a combination thereof, and/or the like.

FIG. 9 depicts an example abstractive context summary scheduling interface 900 as described herein. As shown in FIG. 9, the example abstractive context summary scheduling interface 900 includes a date picker 902, a time picker 904, and a keyword text field 906. As depicted in FIG. 9, the date and/or time picker may be configured such that a member may select a data range and/or a time range that may be used by the communication channel extraction and summary server computing device 106 to generate a customized abstractive context summary, wherein the communication channel extraction and summary server computing device 106 may generate the customized abstractive context summary based on communication data objects that fall within the selected time range and/or date range. As further depicted in FIG. 9, the keyword text field 906 may be configured such that a member may type/enter a keyword (e.g., topic, subject matter, member profile identifier, member name, and/or the like) in the keyword field that may be used by the communication channel extraction and summary server computing device 106 to generate a customized abstractive context summary, wherein the communication channel extraction and summary server computing device 106 may generate the customized abstractive context summary based on communication data objects associated with the keyword (e.g., a subset of communication data objects that include the keyword and/or relate to the keyword).

Returning to FIG. 8 at operation 803, the communication channel extraction and summary server computing device 106, receives a summary generation parameter set in response to user engagement/interaction with the abstractive context summary scheduling interface. In some embodiments, the communication channel extraction and summary server computing device 106 may receive the summary generation parameter set using the customized summary request generator unit 117, wherein the customized summary request generator unit 117 may transmit a summary trigger request to the text extractor unit 113 along with the received summary generation parameter set. For example, in some embodiments, in response to receiving a summary generation parameter set for a selected multi-party communication channel, the customized summary request generator 117 transmits a summary trigger request, along with the summary generation parameter set to the text extractor unit 113. Additionally, in some embodiments, the communication channel extraction and summary server computing device 106 using the customized summary request generator unit 117 may identify/determine the multi-party communication channel identifier associated with the customized summary request and transmit, to the text extractor unit 113, the summary trigger request, along with the summary generation parameter set and the identified/determined multi-party communication channel identifier. In some embodiments, a summary generation parameter set may include one or more of a date range, a time range, and/or keyword.

At operation 804, the communication channel extraction and summary server computing device 106 extracts a plurality of communication data objects from the selected multi-party communication channel based on the summary generation parameter set, wherein the plurality of communication data object may comprise communication data objects associated with the summary generation parameter set (e.g., communication data objects that satisfy the received summary generation parameter set). As described above, in some embodiments, a selected multi-party communication channel may be a multi-party communication channel associated with the multi-party communication channel identifier. In some embodiments, a selected multi-party communication channel may be a multi-party communication channel associated with the multi-party communication channel identifier and associated with a priority indicator.

In some embodiments, the communication channel extraction and summary server computing device 106 extracts the communication data objects associated with the summary generation parameter set using the text extractor unit 113. For example, given a summary generation parameter set that includes a date range of Jun. 12, 2021 to Jun. 12, 2021, a time range of 2 pm to 5 pm, and a keyword "macro", the communication channel extraction and summary server computing device 106 using the text extractor unit 113 may extract only communication data objects that were generated (e.g. by a client computing device associated with a member of the multi-party communication channel) on Jun. 12, 2021 between 2 pm and 5 pm, and comprises and/or is related to "macro".

In some embodiments, extracting the plurality of communication data objects associated with the summary generation parameter set may comprise processing the communication data objects within the multi-party communication channel using an extraction machine learning model to extract the plurality of communication data objects, wherein the extraction machine learning model may be trained to identify certain text and/or data, such as keywords, dates, and time). In some embodiments, extracting communication data objects within a multi-party communication channel comprises extracting each communication data object (e.g., all communication data objects) of the multi-party communication channel and determining/identifying the communication data objects that satisfy the summary generation parameter set. For example, in some embodiments, to extract the communication data objects associated with the summary generation parameter set, the communication channel extraction and summary server computing device 106 parses the extracted communication data objects to identify/determine the communication data objects that satisfy the summary generation parameters.

Figure 10:
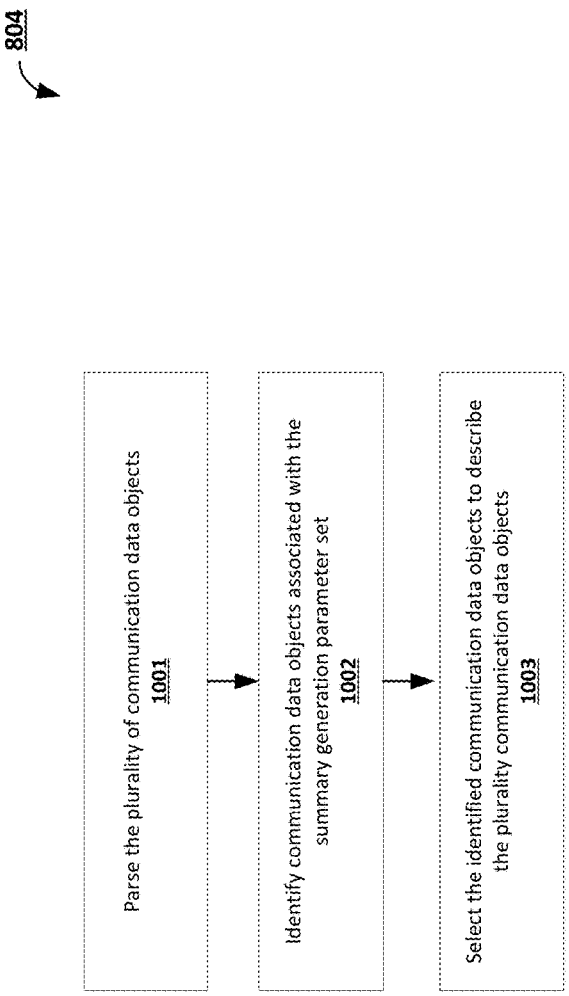
FIG. 10 is flow chart diagram of an example process for extracting communication data objects from a multi-party communication channel in accordance with at least some embodiments of the present invention.

In some embodiments, operation 804 may be performed in accordance with the process that is depicted in FIG. 10. The process that is depicted in FIG. 10 begins at operation 1001 when the communication channel extraction and summary server computing device 106 parses the plurality of extracted communication data objects, wherein the plurality of extracted communication data objects comprise each communication data object associated with the multi-party communication channel.

At operation 1002, the communication channel extraction and summary server computing device 106 identifies communication data objects associated with the summary generation parameter set (e.g., communication data objects that satisfy the summary generation parameters) from the plurality of extracted communication data objects.

At operation 1003, the communication channel extraction and summary server computing device 106 selects the identified communication data objects.

Returning to FIG. 8 at operation 805, the communication channel extraction and summary server computing device 106 performs one or more preprocessing operations on the extracted communication data objects associated with the summary generation parameter set. In some embodiments, the one or more preprocessing operations comprise parsing the extracted communication data objects and/or removing noise from the extracted communication data objects to output text data (e.g., preprocessed communication data objects) that may be provided as input text to a text summarization machine learning model to process in order to generate an abstractive context summary. In some embodiments, the communication channel extraction and summary server computing device 106 performs the one or more preprocessing operations using the preprocessor unit 114, wherein the preprocessor unit 114 may be configured to parse the extracted communication data objects to generate as output text data that may be provided as input to the text summarization machine learning model 124 (as described above). In some embodiments, parsing the extracted communication data objects comprises the removal of unnecessary punctuations or token, weblinks, and other unnecessary aspects and/or noise of the content data.

At operation 806, the communication channel extraction and summary server computing device 106 generates an abstractive context summary for the selected multi-party communication channel using a text summarization machine learning model such as the text summarization machine learning model described above, wherein the text summarization machine learning model may extract the communication data objects in the same manner as described above. For example, the communication channel extraction and summary server computing device 106 processes the communication data objects by providing each communication data object to the text summarization machine learning model to generate an abstractive context summary for the multi-party communication channel based on each communication data object, wherein the generated abstractive context summary comprise a customized abstractive context summary.

At operation 807, the communication channel extraction and summary server computing device 106 causes rendering of the abstractive context summary for display on the client computing device associated with the member profile associated with the customized summary request, wherein the customized abstractive context summary may be rendered on the client computing device as an ephemeral customized abstractive context summary, such that the customized abstractive context summary is visible on the shared multi-party communication channel interface on the client computing device associated with the member profile identifier, but not on the shared multi-party communication channel interface on the client computing device associated with other member profile identifiers.

Figure 11:
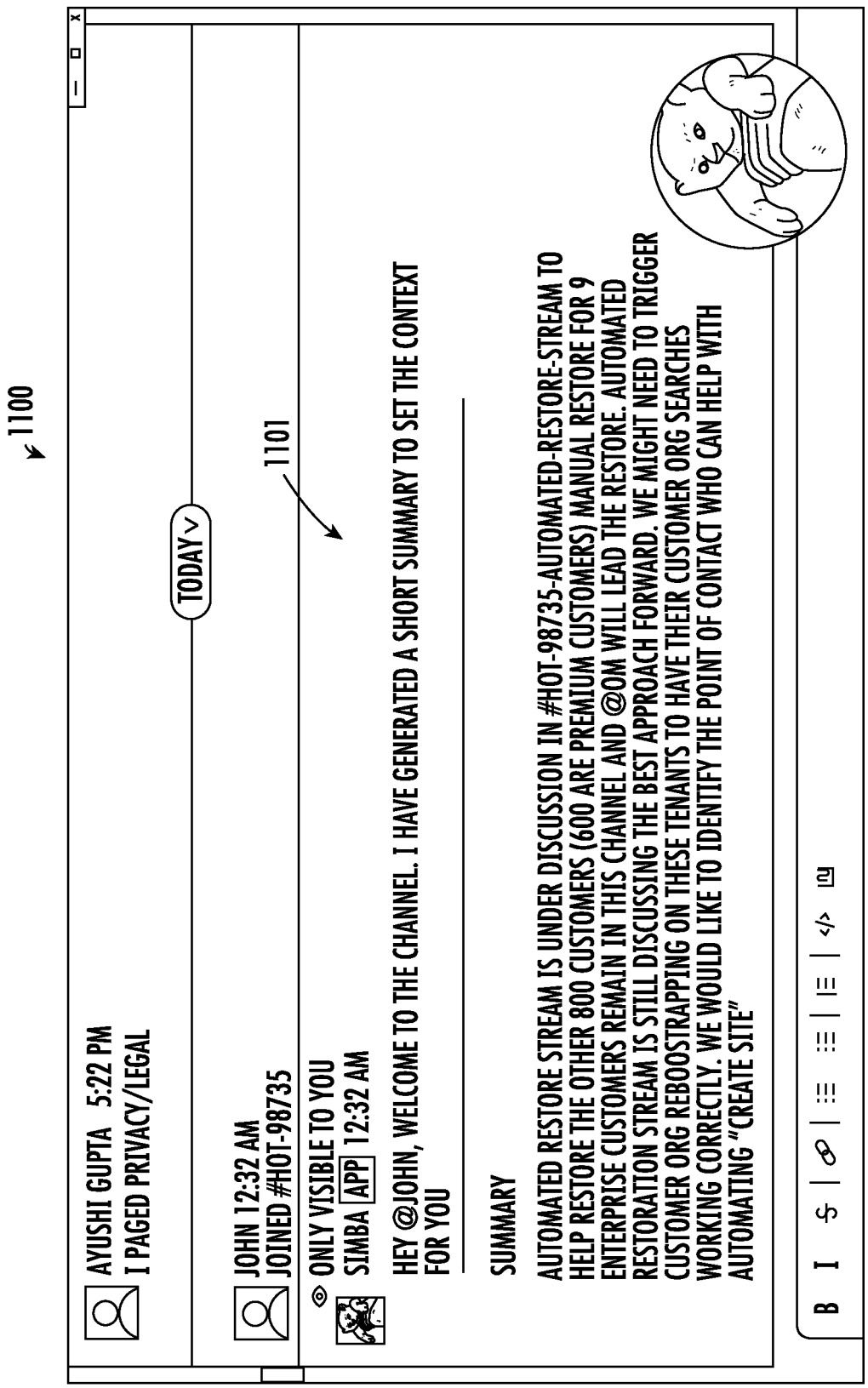
FIG. 11 is an operational example of an abstractive context summary rendered to a multi-party communication channel interface in accordance with at least some embodiments of the present invention.

FIG. 11 depicts an operation example of a multi-party communication channel interface 1100. As shown in FIG. 11, the multi-party communication channel interface may display an abstractive context summary/customized abstractive context summary 1101 generated by the communication channel extraction and summary server computing device 106 and rendered on the associated client computing device.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates a limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Conclusion

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for enabling generation of abstractive context summaries for multi-party communication channels, the apparatus comprising at least one processor and at least one memory including program code, the at least one memory and the program code configured to, with the at least one processor, cause the apparatus to at least:

cause rendering of an abstractive context summary scheduling interface associated with a selected multi-party communication channel to a client computing device associated with a member profile identifier based at least in part on determining that the selected multi-party communication channel is associated with an incident severity level that exceeds an incident severity threshold;

receive a summary generation parameter set in response to user engagement with the abstractive context summary scheduling interface;

extract a plurality of communication data objects from the selected multi-party communication channel based on the summary generation parameter set;

generate, based on the plurality of communication data objects and utilizing a text summarization machine learning model, an abstractive context summary for the selected multi-party communication channel by (i) preprocessing the plurality of communication data objects to generate input text and (ii) inputting the input text into the text summarization machine learning model to receive the abstractive context summary; and transmit computer-executable instructions configured to cause rendering of the abstractive context summary for display on the client computing device associated with the member profile identifier.

2. The apparatus of claim 1, wherein the selected multi-party communication channel comprises a multi-party communication channel of a plurality of multi-party communication channels that is associated with a priority indicator.

3. The apparatus of claim 1, wherein the summary generation parameter set comprises one or more of: (i) a topic data object, (ii) a keyword, or (iii) a date range.

4. The apparatus of claim 1, wherein the text summarization machine learning model is an attention-based transformer text summarization machine learning model.

5. The apparatus of claim 1, wherein the abstractive context summary scheduling interface is rendered in response to a customized summary request.

6. The apparatus of claim 5, wherein the customized summary request is initiated by the client computing device.

7. The apparatus of claim 1, wherein the selected multi-party communication channel comprises a multi-party communication channel generated in response to an incident alert.

8. A computer-implemented method for enabling generation of abstractive context summaries for multi-party communication channels, the computer-implemented method comprising:

causing rendering of an abstractive context summary scheduling interface associated with a selected multi-party communication channel to a client computing device associated with a member profile identifier based at least in part on determining that the selected multi-party communication channel is associated with an incident severity level that exceeds an incident severity threshold;

receiving a summary generation parameter set in response to user engagement with the abstractive context summary scheduling interface;

extracting a plurality of communication data objects from the selected multi-party communication channel based on the summary generation parameter set;

generating, based on the plurality of communication data objects and utilizing a text summarization machine learning model, an abstractive context summary for the selected multi-party communication channel by (i) pre-processing the plurality of communication data objects to generate input text and (ii) inputting the input text into the text summarization machine learning model to receive the abstractive context summary; and transmitting computer-executable instructions configured to cause rendering of the abstractive context summary for display on the client computing device associated with the member profile identifier.

9. The computer-implemented method of claim 8, wherein the selected multi-party communication channel comprises a multi-party communication channel of a plurality of multiparty communication channels that is associated with a priority indicator.

10. The computer-implemented method of claim 8, wherein the summary generation parameter set comprises one or more of: (i) a topic data object, (ii) keyword, or (iii) date range.

11. The computer-implemented method of claim 8, wherein the text summarization machine learning model is an attention-based transformer text summarization machine learning model.

12. The computer-implemented method of claim 8, wherein the abstractive context summary scheduling interface is rendered in response to a customized summary request.

13. The computer-implemented method of claim 12, wherein the customized summary request is initiated by the client computing device.

14. The computer-implemented method of claim 8, wherein the selected multi-party communication channel comprises a multi-party communication channel generated in response to an incident alert.

15. A computer program product for enabling generation of abstractive context summaries for multi-party communication channels, the computer program product comprising at least one non-transitory computer-readable storage medium having computer-readable program code portions stored therein, the computer-readable program code portions configured to:

cause rendering of an abstractive context summary scheduling interface associated with a selected multi-party communication channel to a client computing device associated with a member profile identifier based at least in part on determining that the selected multi-party communication channel is associated with an incident severity level that exceeds an incident severity threshold;

receive a summary generation parameter set in response to user engagement with the abstractive context summary scheduling interface;

extract a plurality of communication data objects from the selected multi-party communication channel based on the summary generation parameter set;

generate, based on the plurality of communication data objects and utilizing a text summarization machine learning model, an abstractive context summary for the selected multi-party communication channel by (i) pre-processing the plurality of communication data objects to generate input text and (ii) inputting the input text into the text summarization machine learning model to receive the abstractive context summary; and transmit computer-executable instructions configured to cause rendering of the abstractive context summary for display on the client computing device associated with the member profile identifier.

16. The computer program product of claim 15, wherein the selected multi-party communication channel comprises a multi-party communication channel of a plurality of multi-party communication channels that is associated with a priority indicator.

17. The computer program product of claim 15, wherein the summary generation parameter set comprises one or more of: (i) a topic data object, (ii) keyword, or (iii) date range.

18. The computer program product of claim 15, wherein the text summarization machine learning model is an attention-based transformer text summarization machine learning model.

19. The computer program product of claim 15, wherein the abstractive context summary scheduling interface is rendered in response to a customized summary request.

20. The computer program product of claim 19, wherein the customized summary request is initiated by the client computing device.

\* \* \* \* \*